United States Patent [19]

Suzuki et al.

[11] Patent Number: 4,602,559
[45] Date of Patent: Jul. 29, 1986

[54] PEELING MACHINE

[76] Inventors: Syouzou Suzuki; Yousuke Suzuki, both of 258, Shimoasahina, Hamaoka-cho; Nobuyoshi Suzuki, 2546-3, Godo, Hamaoka-cho, all of Ogasa-gun, Shizuoka-ken, Japan

[21] Appl. No.: 677,918

[22] Filed: Dec. 4, 1984

[30] Foreign Application Priority Data

Dec. 12, 1983 [JP] Japan ............................. 58-234634

[51] Int. Cl.⁴ .............................................. A23N 7/00
[52] U.S. Cl. ........................................ 99/516; 99/546; 99/584; 99/636; 426/482
[58] Field of Search .......................... 99/516, 534–536, 99/540, 546, 584, 586, 589, 591, 594–599, 635, 636, 642, 643; 426/482, 483

[56] References Cited

U.S. PATENT DOCUMENTS

| | | | |
|---|---|---|---|
| 3,623,524 | 11/1971 | Buck | 99/516 |
| 3,696,848 | 10/1972 | Mellon et al. | 99/516 |
| 4,470,345 | 9/1984 | Miyata | 99/516 |
| 4,481,875 | 11/1984 | Toyosato | 99/516 X |

*Primary Examiner*—Timothy F. Simone

[57] ABSTRACT

A machine for automatically peeling vegetables, particularly onions, and also some fruits. The peeling machine consists of a conveyor belt with devices for holding an individual onion, spaced along the belt, a cutter station where the two ends of the onion are removed as the belt is moved past the station, a reciprocating blade that slits the two outer layers of the onion and a station consisting of two rotating rolls and an air jet where the two outer layers are removed from the onion.

2 Claims, 6 Drawing Figures

PEELING MACHINE

BACKGROUND OF THE INVENTION

The present invention relates to a machine for automatically peeling vegetables, particularly onions, and some fruits.

As shown in FIG. 6, an onion 1 comprises an outer skin 2 which is a thin outer layer of the onion 1, an inner skin 3 which is a layer inside said outer skin 2 and has a thickness of about 1 to 2 mm, and an edible portion 4 inside said inner skin 3. Needless to say, the outer skin 2 is not used for food. The inner skin 3 is not edible either because the inner skin 3 may be discolored or damaged. Therefore, it is necessary to remove the outer skin 2 and the inner skin 3 before cooking the onion.

The onion is usually peeled as follows: First, the two ends, root and stem, (unuseable portions) 1a and 1b of the onion 1 are cut off along lines A and A' (FIG. 5); then, the outer skin 2 and the inner skin 3 are removed from the edible portion 4.

Some other vegetables, such as scallions, some fruits, such as pineapples, are usually peeled in the same manner as onions. First, both ends (unuseable portions) of the vegetable or fruit are cut off, and then the outer covering of the vegetable or fruit is taken off.

In any case, the peeling work is done by hand and requires much labor and time particularly when large quantities of vegetables or fruits are peeled.

BRIEF SUMMARY OF THE INVENTION

It is the object of the present invention to provide a machine for automatically peeling vegetables or fruits, particularly onions.

This object has been attained by a machine having means for automatically removing both ends of the vegetable and means for automatically removing the outer covering of the vegetable.

DETAILED DESCRIPTION

The present invention will now be described with reference to the attached drawings.

Figure 2:
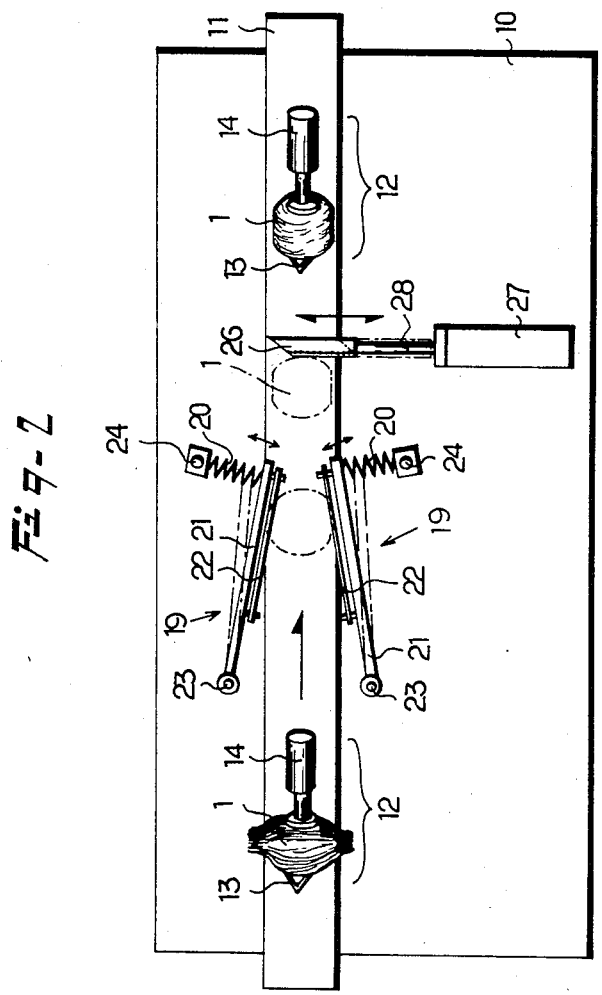
FIG. 2 is a plan view of one portion of said machine taken in the direction of an arrow A in FIG. 1.
Figure 3:
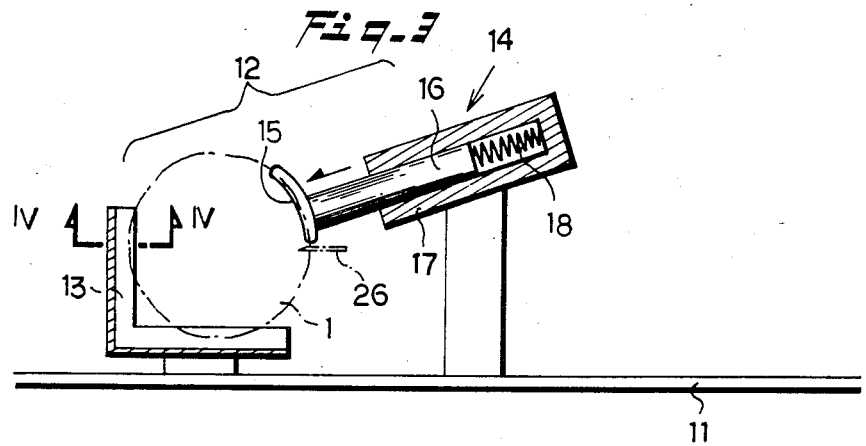
FIG. 3 is a partially sectional view showing the vegetable holding means.
Figure 4:
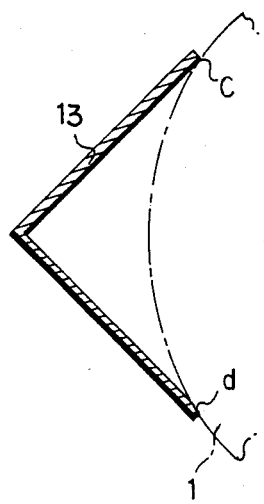
FIG. 4 is an enlarged sectional view taken on line IV—IV of FIG. 3
Figure 6:
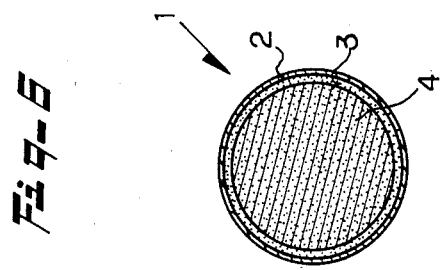
FIG. 6 is a sectional view taken on line VI—VI of FIG. 5
Figure 5:
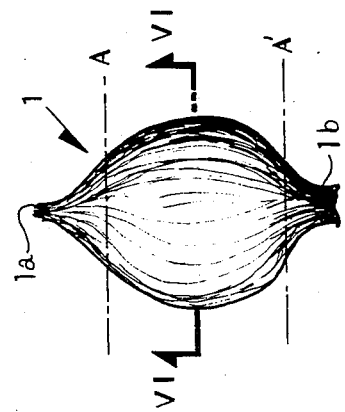
FIG. 5 is a view illustrating an onion.

Numeral 10 represents a frame of a peeling machine according to the present invention. A conveyor 11, such as a chain conveyor, driven by a suitable driving means (not shown) is mounted on the frame, said conveyor 11 being preferably in an inclined position. A plurality of vegetable-holding means 12 are fixed on the conveyor 11 at suitable intervals. The vegetable-holding means 12 comprises a vegetable support 13 and a vegetable pressing device 14 opposing said vegetable support 13 (at the right of said vegetable support 13 in FIGS. 2 and 3). The vegetable support 13 preferably comprises an angle bar member formed so as to have a general shape resembling the letter L (See FIGS. 3 and 4.). The vegetable pressing device 14 is adapted to press a vegetable 1, such as an onion, against the vegetable support 13 so as to hold the vegetable 1 in place thereon. Said vegetable pressing device 14 comprises, for example, a supporting cylinder 17 mounted on said conveyor 11, a pushing shaft 16 provided at one end thereof with a vegetable pressing surface 15, the other end of said shaft 16 being slidably inserted into said supporting cylinder 17, and a spring 18 being positioned between said other end (inner end) of said shaft 16 and the closed end of said supporting cylinder 17 so that said spring 18 always presses said shaft 16 toward said vegetable support 13 (See FIG. 3.)

Figure 1:
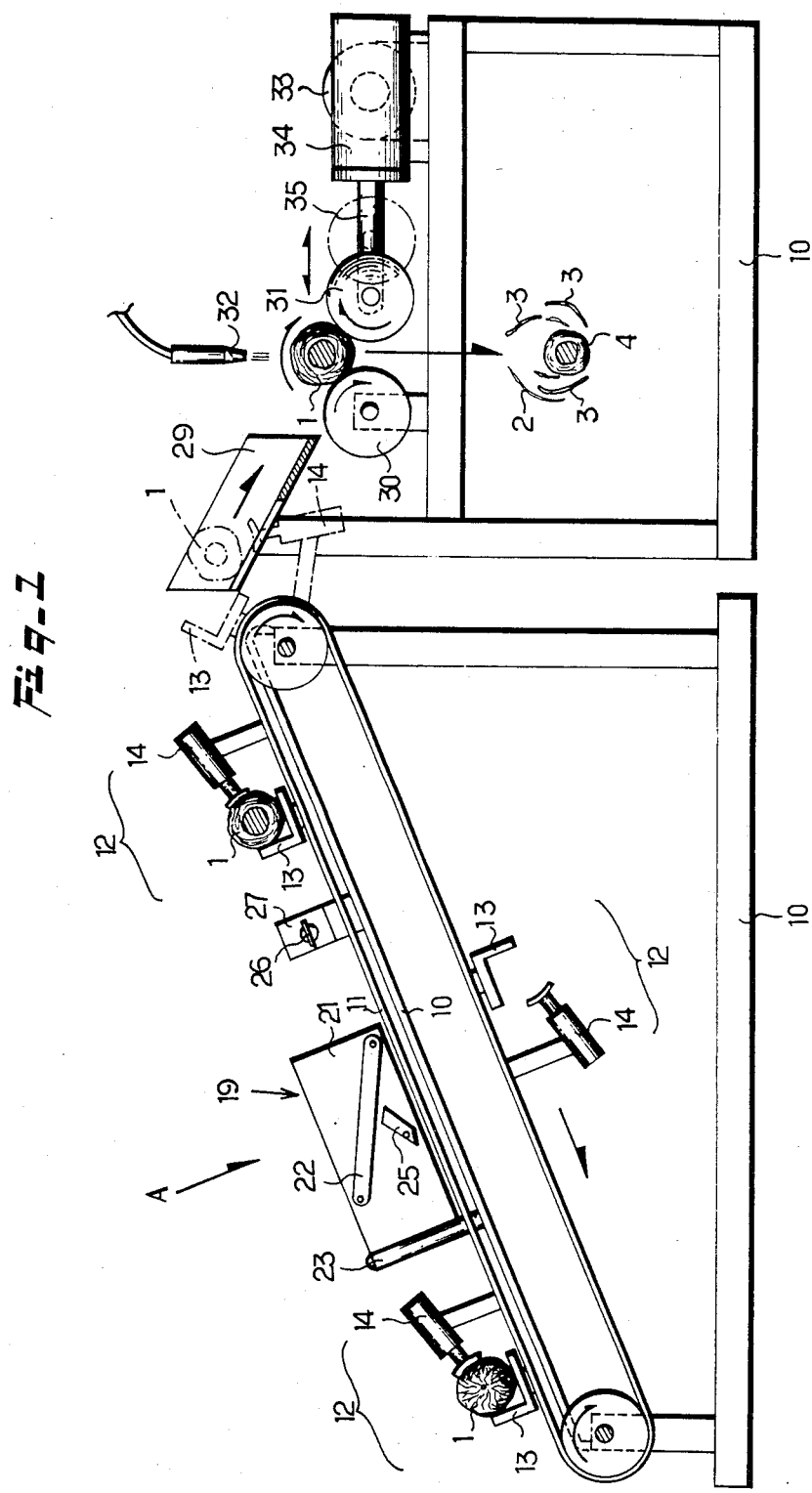
FIG. 1 is a schematic elevation illustrating a peeling machine according to the present invention.

A cutting device 19 for cutting off an end of the vegetable is disposed one on each side of the conveyor 11 on the frame 10. Each of the cutting devices 19 comprises a cutter-supporting member 21 pivotably mounted at its leading end (left end in FIG. 2) at pivot 23 and adapted to pivot in a plane parallel with the surface of the conveyor 11, the trailing portion (right portion in FIG. 2) of said cutter-supporting member 21 being urged inward (toward the center line of the conveyor 11) by spring means 20, said cutter-supporting member 21 being provided on its inside with a cutter 22. The cutting edge of said cutter 22 is preferably inclined with respect to the plane of travel of the conveyor 11, but it may be perpendicular thereto or also may be a disc cutter rotated by an electric motor. Referring further to the cutter-supporting member 21, a pivot shaft 23 is erected at each side of the conveyor 11, the leading end of the cutter-supporting member 21 being attached to said pivot shaft 23, said spring means 20 being disposed between said trailing portion of the cutter-supporting member 21 and a spring support 24 erected on the frame 10. When the cutter 22 is inclined with respect to the plane of travel of the conveyor 11, it is desirable that an auxiliary cutter 25, with its cutting edge inclined in a direction opposite to the direction of inclination of said cutter 22, is attached to the inside of the cutter-supporting member 21, under said cutter 22 (See FIG. 1.). When the auxiliary cutter 25 is attached under the cutter 22, the ends of the vegetable are more certain to be removed.

A slitter-cutter 26 is disposed at one side of the conveyor 11 beyond one of the vegetable-end cutting devices 19, said slitter-cutter 26 being adapted to move back and forth substantially perpendicularly to the direction of feed of the conveyor 11. For example, at one side of the conveyor 11 behind one of the cutting devices 19, an air cylinder 27 is disposed in a direction substantially perpendicular to the direction of feed of the conveyor 11, and the slitter-cutter 26 is attached to the end of the piston rod 28 of the air cylinder 27 (See FIG. 2.). The slitter-cutter 26 cuts into the outer covering (the outer skin 2 and the inner skin 3 in case of the onion) of the vegetable so as to facilitate removing the outer covering, said slitter-cutter 26 being adapted to move quickly so as to coincide in time with the feed of the vegetable.

The discharge end of the conveyor 11 is connected, through the intermediary of a chute 29, with means for automatically removing the outer covering of the vegetable. The means comprises a pair of rollers 30 and 31 disposed near the outlet of the chute 29, said rollers 30 and 31 being suitably spaced to receive the vegetable and being rotated in the same direction so as to rotate the vegetable. An air blowing nozzle 32 is provided near said rollers 30 and 31, said air nozzle 32 being adapted to blow compressed air from an air compressor (not shown) against the vegetable to dislodge the outer covering. At least one of the rollers 30 and 31 is adapted to move forward and backward at controlled time intervals to change the spacing between the two rollers. For example, the roller 30 is in a fixed position and is rotated in one direction through a belt, chain, or the like, etc. (not shown) by an electric motor 33. The other roller 31 is attached to the end of the piston rod 35 of a cylinder 34 controlled to act at controlled time intervals (for example, every 2 to 3 seconds) by a timer, said roller 31 being rotated, in the same direction as the roller 30, through flexible power transmission means (not shown) by said electric motor 33.

The operation of the peeling machine according to the present invention will now be described, using onions as an example. It is to be noted that the following description applies also in the case of peeling other vegetables such as scallions and fruits such as pineapples.

At the front end (left end in FIGS. 1 and 2) of the conveyor 11, each onion 1 is placed sideways on a vegetable support 13 of a vegetable-holding means 12. Then, the onion 1 is pressed against the vegetable support 13 by a vegetable pressing device 14 and is firmly held between them. Particularly when the vegetable support 13 comprises an angle bar formed so as to have a general shape resembling the letter L, the onion 1 is held very securely because it is supported on two points (c and d) of the vertical portion of the vegetable support 13 and further two points of the horizontal portion thereof (See FIGS. 3 and 4). When the onion 1, thus held by the vegetable-holding means 12, is passed between the two vegetable end cutting devices 19 by the conveyor 11, the onion 1 pushes the cutter supporting members 21 outward against the force of the spring means 20 as shown by broken lines in FIG. 2, and both ends 1a and 1b of the onion 1 are cut off by the cutters 22 and auxiliary cutters 25 attached to the inside of the cutter supporting members 21. Even onions having various sizes are cut respectively to their suitable size because the cutting devices 19 at the two sides of the conveyor 11 are pushed outward by the onions according to their size. When the onion 1 has passed between the cutting devices 19, the cutting devices 19 are returned to their original positions by the spring means 20. When the onion 1, both ends of which have been cut off by the cutting devices 19, is conveyed near the slitter-cutter 26 by the conveyor 11, the slitter-cutter 26 is quickly moved across the conveyor 11 by the air cylinder 27 so as to cut into the outer covering (outer skin 2 and into the inner skin 3) of the onion 1 (See FIG. 3.) and then the slitter-cutter 26 is quickly returned to its original position by the air cylinder 27. When the vegetable holding means 12 comes to the discharge end (right end in FIGS. 1 and 2) of the conveyor 11, the distance between the vegetable pressing device 14 and the vegetable support 13 becomes larger as shown by broken lines in FIG. 1, and the onion 1 is released from the vegetable holding means 12. The onion 1 then drops through the chute 29 onto the rollers 30 and 31 which are suitably spaced to hold the onion. Since the rollers 30 and 31 are rotating in the same direction, the onion 1 also is rotated in the same direction (See arrows in FIG. 1). At the same time, compressed air is blown onto the onion 1 from the air blowing nozzle 32. That is, since the onion 1, which has a cut made by the slitter-cutter 26 and whose ends 1a and 1b have been cut off, is rotated on the rollers 30 and 31 while being blown by compressed air, the outer skin 2 and inner skin 3 of the onion 1 are separated from the edible portion 4. When the roller 31 is moved toward the right in FIG. 1 so as to increase the distance between the rollers 30 and 31, the edible portion 4, outer skin 2 and inner skin 3 of the onion 1 separately fall through the opening between the rollers 30 and 31. Then, the roller 31 is returned to its original position. Thus, the outer skin 2 and inner skin 3 of the onion 1 are automatically separated from the edible portion.

As mentioned above, if vegetables such as onions are put on the vegetable supports of the vegetable holding means, the peeling machine of the invention automatically peels the vegetables. Therefore, the peeling machine saves much time and labor particularly when large quantities of vegetables are handled. Although the peeling machine has been described with reference to peeling onions, the invention is not limited to such and, as is obvious from the specification and drawings, the machine is suitable for peeling other vegetables and some fruits.

What is claimed is:

1. A vegetable peeling machine comprising
a conveyor supporting frame, a conveyor supported on said frame, means for driving said conveyor,
a plurality of vegetable holding means fixed on said conveyor, each of said vegetable holding means comprising a vegetable support comprising an angle bar having a general shape resembling the letter L and a vegetable pressing device disposed opposite said vegetable support to hold the vegetable with its longitudinal axis substantially transverse to the direction of travel of said conveyor,
a vegetable end cutting device disposed on said frame, one on each side of said conveyor, each cutting device comprising a cutter supporting member extending in the direction of travel of said conveyor and pivotably mounted at its leading end on said frame and adapted to pivot in a plane parallel to the surface of said conveyor, said cutter support member being urged inward toward said conveyor about said pivotable mounting by spring means, said cutter supporting member having fixed on its inside a cutter having a cutting edge which cuts off an end of a vegetable held in said vegetable holding means as said conveyor moves past said cutter, said cutting edge of said cutter being inclined with respect to the plane of travel of said conveyor,
a pair of horizontal rollers disposed adjacent to the discharge end of said conveyor, said rollers being rotated in the same direction and being spaced apart to receive and to rotate said vegetable, and
an air nozzle disposed adjacent to said rollers, said air nozzle being adapted to blow compressed air on to said vegetable whereby the outer covering of said vegetable is removed,
at least one of said rollers being adapted to be moved away from the other said roller after a desired time interval to provide an opening for discharge of said peeled vegetable and peelings.

2. In a vegetable peeling machine the improvement which comprises:
a conveyor supporting frame, a conveyor supported on said frame, means for driving said conveyor, a plurality of vegetable holding means fixed on said conveyor, each of said vegetable holding means comprising a vegetable support comprising an angle bar having a general shape resembling the letter L and a vegetable pressing device disposed opposite said vegetable support to hold the vegetable with its longitudinal axis substantially transverse to the direction of travel of said conveyor, a vegetable end cutting device disposed on said frame, one on each side of said conveyor, each cutting device comprising a cutter supporting member extending in the direction of travel of said conveyor and pivotably mounted at its leading end on said frame and adapted to pivot in a plane parallel to the surface of said conveyor, said cutter support member being urged inward toward said conveyor about said pivotable mounting by spring means, and an elongated cutter fixed on the inside face of said cutter support member, said cutter having a cutting edge which is inclined with respect to the plane of travel of said conveyor and which cuts off an end of a vegetable held in said vegetable holding means as said conveyor moves past said cutter, and means for removing the outer covering of the vegetable.

* * * * *